(12) United States Patent  (10) Patent No.: US 8,352,191 B2
McAhren  (45) Date of Patent: Jan. 8, 2013

(54) SEISMIC DETECTION IN ELECTRICITY METERS

(75) Inventor: John P. McAhren, Houston, TX (US)

(73) Assignee: Landis+Gyr, Inc., Lafayette, IN (US)

( * ) Notice: Subject to any disclaimer, the term of this patent is extended or adjusted under 35 U.S.C. 154(b) by 394 days.

(21) Appl. No.: 12/652,007

(22) Filed: Jan. 4, 2010

(65) Prior Publication Data

US 2010/0174490 A1   Jul. 8, 2010

Related U.S. Application Data

(60) Provisional application No. 61/204,187, filed on Jan. 2, 2009.

(51) Int. Cl.
*G01V 1/00* (2006.01)
(52) U.S. Cl. ......................................................... 702/14
(58) Field of Classification Search ..................... 702/14
See application file for complete search history.

(56) References Cited

U.S. PATENT DOCUMENTS

| | | | |
|---|---|---|---|
| 6,938,637 B2 * | 9/2005 | McGill et al. | 137/39 |
| 7,005,993 B2 | 2/2006 | Webb et al. | |
| 7,375,646 B1 * | 5/2008 | Diaz-Lopez | 340/690 |
| 7,432,823 B2 * | 10/2008 | Soni | 340/870.02 |
| 2002/0170595 A1 * | 11/2002 | Oliver | 137/38 |
| 2007/0199382 A1 * | 8/2007 | Sakai | 73/645 |
| 2011/0085419 A1 * | 4/2011 | Ronnow et al. | 367/43 |

* cited by examiner

*Primary Examiner* — Aditya Bhat
(74) *Attorney, Agent, or Firm* — Maginot, Moore & Beck

(57) ABSTRACT

An arrangement for recording seismic events includes an electricity meter sensor circuit, a digital processing circuit, and an accelerometer operably connected to the digital processing circuit. The accelerometer is configured to provide signals representative of seismic information to the digital processing circuit. A memory is configured to store data records relating to at least some of the seismic information.

20 Claims, 3 Drawing Sheets

SEISMIC DETECTION IN ELECTRICITY METERS

This application claims the benefit of U.S. Provisional Patent Application Ser. No. 61/204,187, filed Jan. 2, 2009, which is incorporated herein by reference.

FIELD OF THE INVENTION

This invention relates generally to seismic monitoring.

BACKGROUND OF THE INVENTION

There is a need for networks of seismic monitoring devices, particularly in areas prone to frequent seismic activity. A network of seismic monitoring devices can provide data for analysis regarding seismic activity, and in some cases can operate as an early warning network. However, permanent installation of seismic monitoring equipment in sufficient quantities for monitoring is often costly and relatively difficult to maintain.

One solution employs special purpose laptop or portable computers that are disposed at various locations of a seismically active area. Seismic sensors attached to or disposed within the laptop computer detect seismic activity. The laptop computers communicate information to a central data point via the Internet. The system relies on laptop computers, which can be moved and/or subject to motion or disturbance not associated with seismic activity.

There is a need, therefore, for improved seismic monitoring that avoids drawbacks associated with traditional installation of seismic sensors, as well as drawbacks associated with the reliance on seismic sensors in portable computing devices.

SUMMARY OF THE INVENTION

At least some embodiments of the present invention address the above-described need, as well as others, by providing seismic sensing and logging equipment in electricity meters. Electricity meters are devices the measure and/or meter aspects of energy provided to a load. The load may be a residence, business, or even part of a larger electricity distribution system. Electricity meters are generally designed to withstand a wide range of environmental and electrical conditions, and are usually affixed to secure structures. Accordingly, seismic devices placed within utility meters will more effectively detect and identify seismic disturbances.

A first embodiment of the invention is an arrangement for recording seismic events that includes an electricity meter sensor circuit, a digital processing circuit, and an accelerometer connected to the digital processing circuit. The accelerometer is configured to provide signals representative of seismic information to the digital processing circuit. The arrangement also includes a memory configured to store data records relating to at least some of the seismic information.

A second embodiment is a system that includes a plurality of electricity meters and a data collector. Each electricity meter is configured to meter electrical energy provided to a load. Each electricity meter also includes an accelerometer configured to detect seismic events, and a communication device configured to transmit information representative of the detected seismic events. The data collector is configured to receive the records of detected seismic events from the plurality of electricity meters.

At least one embodiment of a meter arrangement according to the invention will monitor for seismic activity on a continuous basis. Upon a seismic occurrence or other event such as meter tampering, the meter arrangement will record the duration and magnitude of the event with an event time stamp. In some embodiments, the seismic waveform for the event may also be captured and stored. In some implementations, the information can be reported to an external software package through one of the communication ports contained within the meter.

At least one advantage of some embodiments of the present invention arises from the fact that a utility may obtain seismic information from geographically dispersed meters, thereby providing an indication of locations of possible vulnerabilities of the power grid.

The above described features and advantages, as well as others, will become more readily apparent to those of ordinary skill in the art by reference to the following detailed description and accompanying drawings.

DETAILED DESCRIPTION

Figure 1:
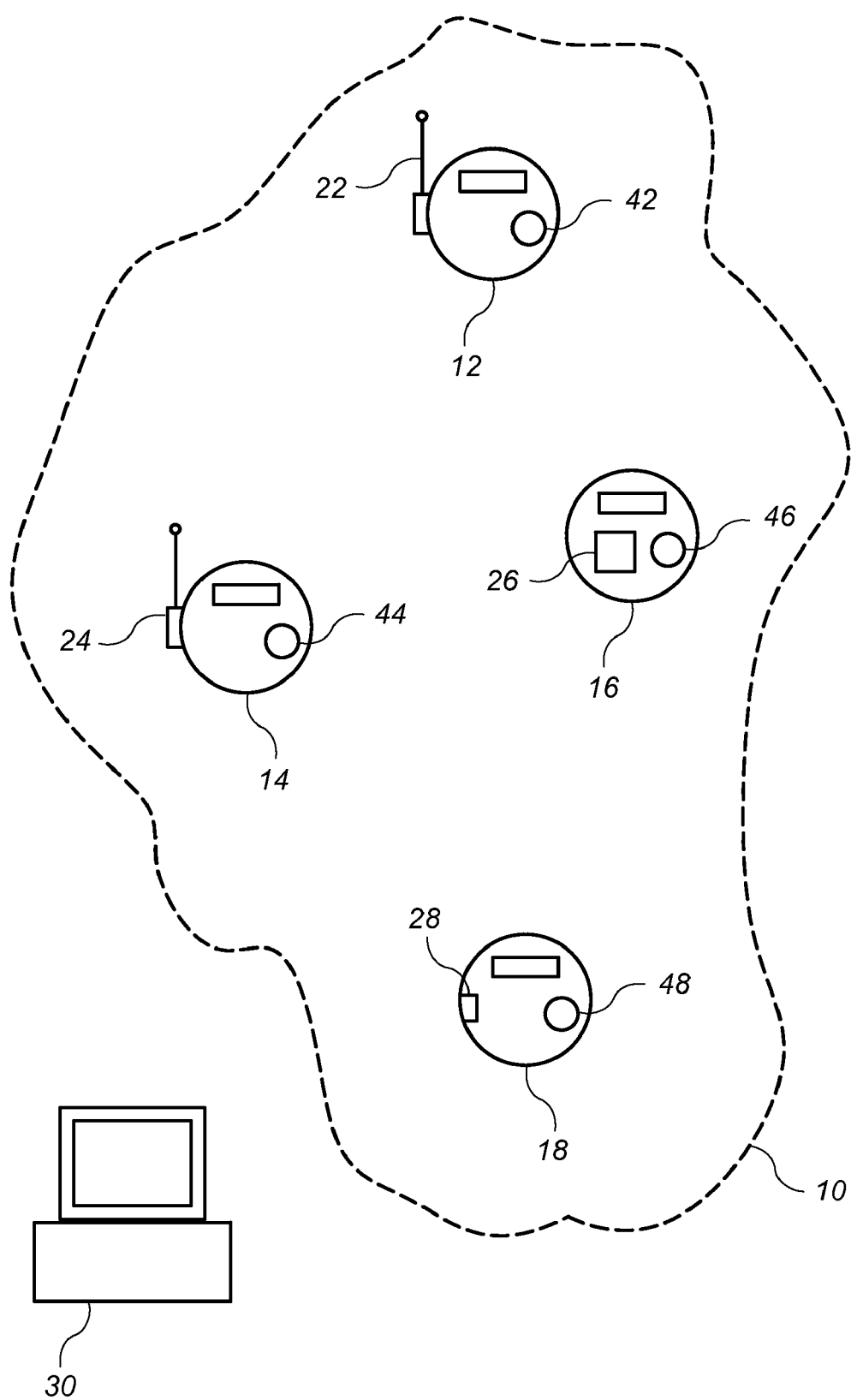
FIG. 1 shows an exemplary system according to a first embodiment of the invention.

FIG. 1 shows an exemplary system according to a first embodiment of the invention. The system includes four seismic monitoring electricity meters 12, 14, 16 and 18 dispersed throughout a geographical area 10. It will be noted that the example of FIG. 1 is simplified for exposition purposes, and that actual implementations can involve dozens, hundreds or even thousands of seismic monitoring electricity meters in a geographical area.

Figure 2:
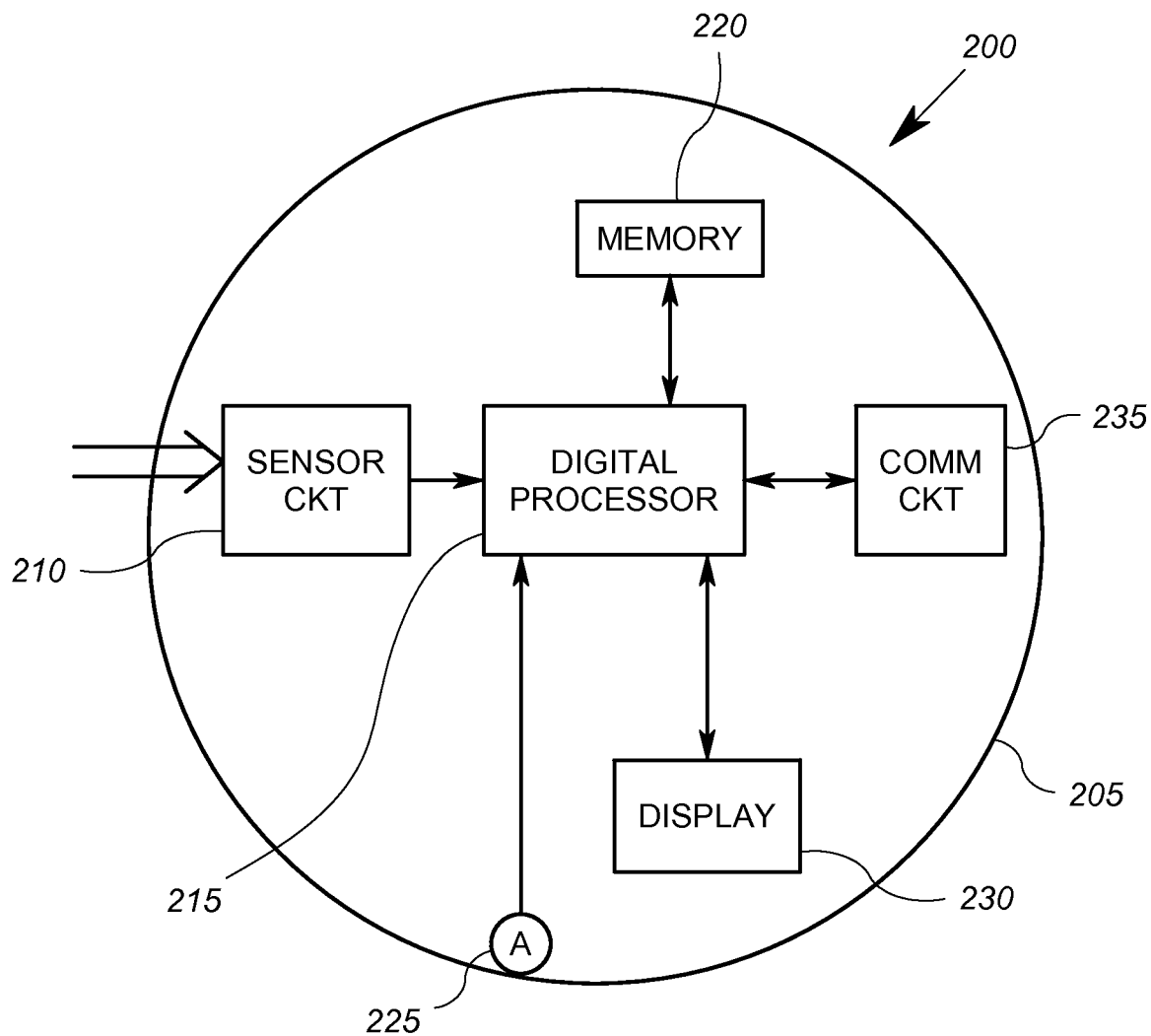
FIG. 2 shows a schematic block diagram of a meter incorporating an exemplary embodiment of the invention.

The meters 12, 14, 16 and 18 all include circuitry of a digital electricity meter. Digital electricity meters are electricity meters that employ programmed processors and/or controllers that control at least part of the metering operations. By contrast, pure electro-mechanical meters rely exclusively on rotating disk sensors with mechanical counters. Digital electricity meters are well known and have a variety of designs, including those that even incorporate rotating disk sensors. An example of a digital electricity meter adapted for use in connection with the present invention is shown in FIG. 2, discussed further below.

Referring again to FIG. 1, the meters 12, 14, 16 and 18 all include circuitry for communicating externally. For example, the meters 12, 14 each include respective radio frequency devices (e.g. pager radios) 22, 24 that communicate through a wireless radio network to a central data repository 30. In another example, the meter 16 includes a power line communication circuit 26 that is operable to communicate to the central data repository 30 via signals modulated onto the 60 Hz power line. In yet another example, the meter 18 includes a communication port 28 that is capable of communicating wireless (via optical communications or short-range RF) with a local portable computer that is external to the meter 18. Such a portable computer may be a data collector that is used by a technician to gather data from many meters, and then to upload the data to the central data repository 30. In some systems, less than all of these communication methods are used to transfer data to the repository 30. In other systems, other communication methods may be used.

In accordance with embodiments of the present invention, each of the meters 12, 14, 16 and 18 includes a respective accelerometer circuit 42, 44, 46 and 48. Each accelerometer circuit 42, 44, 46 and 48 is configured to detect seismic events and generate information representative the seismic events within the meter. FIG. 2, discussed further below, illustrates further detail regarding a suitable accelerometer circuit.

The central repository 30 is a computer server or the like that is operable to collect data from the meters 12, 14, 16 and 18. The central repository 30 then stores the data and makes the data available for other processes, display or printout.

In operation, each of the accelerometer circuits 42, 44, 46 and 48 within the meters 12, 14, 16 and 18 detects seismic events. If a seismic event is detected by any of the accelerometer circuits 42, 44, 46 and 48, then the circuitry within the corresponding meter 12, 14, 16 and 18 time-stamps and stores a waveform representative of the event. If the detected seismic event exceeds a predetermined level, or otherwise indicates a possible pending emergency, then the respective meter immediately communicates the event (at least in the case of the meters 12, 14 and 16) to the central repository 30 and/or possibly another site. Such "emergency" notification may be used to provide early warning capabilities or other real-time notification of the size, geometry and propagation of a relatively significant event.

In the absence of such emergency communications, however, each of the meters 12, 14, 16 and 18 periodically communicates all stored time-stamped seismic event records to the central repository 30 via their respective communication means 22, 24, 26 and 28. Such information may be used for general geological processing.

Utilities can use the information in the central repository 30 to monitor seismic activity and correlate these readings to the amount of damage in each metered location. In particular, utilities in seismically active areas often have their own geology department that can use the information to monitor and study seismic activity across the grid to identify vulnerability in the grid system. With respect to existing applications in the field of geology and seismology, embodiments of the invention can provide a stable and well distributed network of seismic monitoring devices that can record and report magnitude and duration of earthquakes for use in early detection and earthquake warning systems.

FIG. 2 shows an exemplary meter 200 that may be used as any of the meters 12, 14, 16 and 18. The meter 200 includes a housing 205, in which are disposed a sensor circuit 210, a digital processing circuit 215, a memory circuit 220, an accelerometer circuit 225, a display 230 and a communication circuit 235.

The housing 205 may take any suitable form, and is generally configured to withstand a wide range of environmental conditions. The housing 205 also provides at least some protection against environmental conditions to the various elements disposed therein. Suitable housings for utility meters are well-known in the art.

The sensor circuit 210 in one embodiment includes voltage sensors and current sensors, not shown, that are operable to receive voltage and current signals representative of voltage and current provided to a load and generate measurement signals therefrom. In particular, the measurement signals generated by the sensor circuit 210 are analog signals each having a waveform representative of the voltage and current provided to the load. A suitable example of a voltage sensor includes a voltage divider that is operably coupled to the power lines. A suitable example of a current sensor includes a current transformer that is disposed in a current sensing relationship with the power line signal. These are other types of voltage and current sensors are known in the art.

The digital processing circuit 215 is a circuit that is configured to receive the analog measurement signals from the sensor circuit 210 and generate energy consumption data therefrom. According to an exemplary embodiment, the processing circuit 215 includes analog interface circuitry that receives and digitizes the measurement signals (and thus typically contains an A/D converter), and digital processing circuitry that processes the digitized measurement signals to thereby generate the energy consumption data. Such circuits are well known in the art. As is known in the art, the processing circuit 215 may include, in addition to an A/D converter, a controller and/or digital signal processor.

As will be discussed below, many of the seismic detection, logging and reporting operations also involve processing of digital measurement signals or other digital information. Accordingly, in this embodiment, the processing circuit 215 is configured to perform the processing necessary for detection, logging and reporting of seismic data, in addition to the meter functions described above. To this end, it will be appreciated that the processing circuit 215 may include a plurality of processing devices, wherein one or more are shared by such functions.

The memory 220 refers to a collection of at least one, and typically multiple, storage devices of different types. The memory 220 may include volatile or non-volatile RAM, EEPROM, and/or other readable and writeable memory device. The memory 220 stores a data log of detected seismic events. The data log of detected seismic events may be a plurality of records, each record including a short waveform log. A waveform log represents the progression of the seismic event as graph of magnitude (i.e. Richter scale measurement) versus time. The stored waveform log may take the form of a plurality of consecutive seismic measurements made during an event at short intervals, for example several times per second.

The communication circuit 235 is operably coupled to the processing circuit 215, and is also operable to communicate with a remote device. The communication circuit 235 may, for example, transmit signals to the remote device via a tangible communication link (e.g., cable, wire, fiber, etc.), or via a wireless communication link. For example, the communication circuit 235 is operable to transmit data representative of a seismic event records or the entire seismic log stored in the memory 220 to an external device.

The accelerometer circuit 225 may suitably be a self-contained unit that includes an accelerometer and processing circuitry. In such a configuration, the accelerometer circuit 225 is configured to provide digital seismic data to the digital processing circuit 215 of the meter 200.

In other cases, however, the accelerometer circuit 225 comprises primarily an accelerometer and any necessary analog driving components (buffer amplifier, filters). In such a case, the accelerometer circuit 225 is configured to provide analog seismic measurement signals to the processing circuit 215. The A/D conversion circuit of the processing circuit 215 would then be used to digitize the analog seismic measurement signals.

The accelerometer circuit 225 may also suitably include a TEMS solid state accelerometer device. Alternatively, the accelerometer circuit 225 may suitably include the seismic detection circuit shown in FIG. 3 of U.S. Pat. No. 7,005,993 to Webb et al., the entirety of which is incorporated herein by reference.

The display 230 is operably coupled to the processing unit 215 and provides a visual display of information, such as information regarding the operation of the meter 200. For example, the display 230 may provide a visual display regarding the power measurement operations (or even seismic events) of the meter 200. For example, the processing unit 215 may display a running quantity representative of the accumulated energy usage of the load to which the meter 200 is attached.

In accordance with embodiments of the invention, time-stamped seismic events are detected and then recorded in a log stored in the memory 220. To this end, the seismic movements of the earth translate through the structure to which the meter 200 is mounted. The seismic movements further translate to the accelerometer of the accelerometer circuit 225. The accelerometer circuit 225, as is known in the art, generates an output signal representative of the g-force imposed on the accelerometer by the seismic movement. As discussed above, the accelerometer circuit 225 can generate an analog output signal that is representative of the seismic disturbance. Such an output signal is considered to be the analog seismic signal.

In this embodiment, the accelerometer circuit 225 provides the analog seismic signal to the digital processing circuit 215. The digital processing circuit 215 converts the analog seismic signal to a digital seismic signal by sampling the analog seismic signal using an A/D converter. Accordingly, the digital seismic signal constitutes a series of samples that represent, in digital format, the waveform of the seismic signal.

The processing circuit 215 will then store the recorded waveform with a time-stamp preferably provided by a GPS time source or similarly accurate time source, not shown.

In general, the processing circuit 215 does not record every sampled output from the accelerometer circuit 225. Preferably, the processing circuit 215 only records information relating to "events", or in particular, when the analog seismic signal is more than trivially non-zero. In addition, the processing circuit 215 preferably only recognizes an event when the seismic signal meets certain prerequisites consistent with the existence of an earthquake or other event. Methods for recognizing accelerometer output patterns that correspond to seismic events are known, and examples can be found in U.S. Pat. No. 7,005,993.

During normal operation, the digital processing circuit 215 in this embodiment monitors the output of the accelerometer circuit 225 and identifies when any event to be recorded is occurring.

In one exemplary operation, if the output of the accelerometer circuit 225 indicates a measurement exceeding a first threshold, then the processing circuit 215 may store samples of the measurement that occur until the measurement falls below the first threshold. The resulting stored values represent the seismic waveform of the event. Upon completion of the event, the processing circuit 215 stores the waveform as a time stamped record.

The processing circuit 215 also suitably provides the information to an external device (i.e. the central data facility 30 of FIG. 1) upon receiving an externally generated request signal, or according to a scheduled data upload.

In addition, the processing circuit 215 is preferably configured to immediately communicate any instance in which the accelerometer circuit 225 indicates a measurement exceeding a second, higher threshold. By way of example, the second threshhold may correspond to a predetermined value on the Richter scale. Alternatively, the processing circuit 215 can communicate detection of a P-wave of predetermined magnitude. This feature provides emergency warning of a developing or occurring event. The processing circuit 215 does not await the completion of such an event before communicating a signal indicating its occurrence. In some embodiments, the digital processing circuit 215 may employ early warning operation of U.S. Pat. No. 7,005,993.

One of the advantages of the embodiment described above is that it can record information on seismic events even if such events are not sufficient to constitute a possible emergency. For example, the digital processing circuit 215 can record minor seismic events and report them to a central facility for the purposes of assisting in preventive maintenance of the grid. To this end, if several meters detect and report a minor seismic event, the utility can determine the geographical extent of the event (based on the meters having the time-stamped record of the event), and perform inspection of equipment within the indicated area to investigate whether damage has occurred. In such cases, the processing circuits 215 of the meters store and communicate records of events that do not rise to the level of requiring emergency early warning communications.

Figure 3:
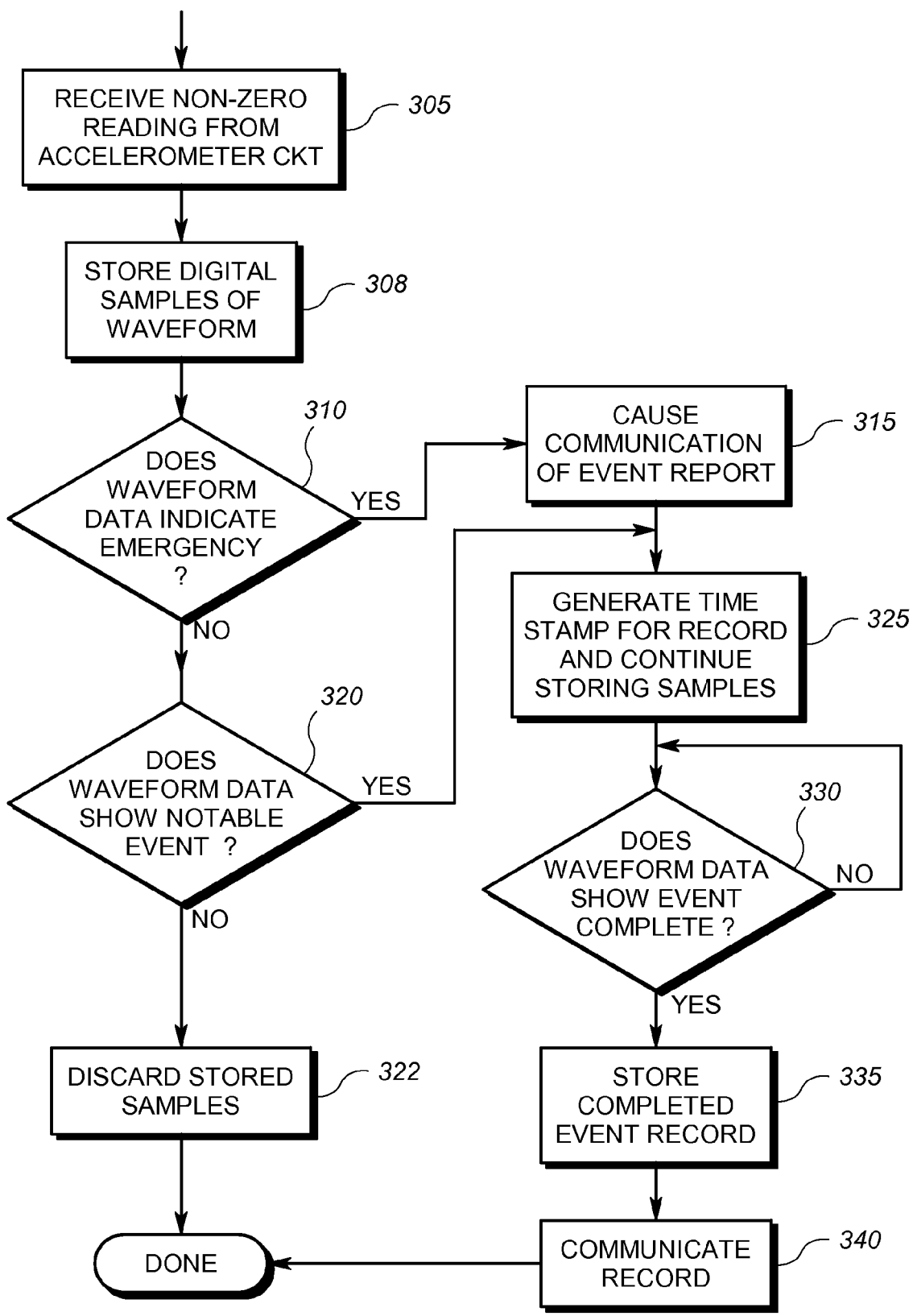
FIG. 3 shows a flow diagram of an exemplary set of operations of a processing circuit of the meter of FIG. 2.

FIG. 3 shows an exemplary set of functions that may be performed by the digital processing circuit 215 in normal operation of monitoring for seismic events. It will be appreciated that the digital processing circuit 215 may contemporaneously perform normal metering operations based on the voltage and current measurement signals received from the sensor circuit 210. Such metering operations, however, are known the art and are not discussed further herein. Instead, FIG. 3 relates specifically to the seismic monitoring operations of the digital processing circuit 215. It will be appreciated that the functions of FIG. 3 are shown in a general nature only. Specific implementation and program code to carry out such functions can be developed by those of ordinary skill in the art to suit their configuration and system preferences.

The digital processing circuit 215 starts the operations of FIG. 3 upon reception of a non-zero reading from the accelerometer circuit 225 (Step 305). It is presumed that the accelerometer circuit 225 includes at least some filtering circuitry, which operates to increase the likelihood that any non-zero reading corresponds to a true physical disturbance of the meter housing. Accordingly, erroneous and/or noise readings do not necessarily trigger step 305.

After detection of a non-zero seismic signal in step 305, the digital processing circuit 215 proceeds to step 308. In step 308, the processing circuit 215 begins storing the digital samples of the seismic signal waveform in the memory 220. The storage may be of a temporary nature, such as is in volatile random access memory.

In step 310, the digital processing circuit 215 performs analysis on the seismic signal from the accelerometer circuit 225 to determine if an emergency condition is indicated. Specifically, the digital processing circuit 215 uses a predetermined set of rules to determine if the non-zero seismic information corresponds to an event requiring emergency notification. The predetermined set of rules can include analysis of the magnitude, duration, and/or shape of the non-zero seismic signal. By way of example, the digital processing circuit 215 may perform analysis similar to that disclosed in U.S. Pat. No. 7,005,993. If the digital processing circuit 215 determines that an emergency condition is indicated, then the digital processing circuit 215 proceeds to step 315. Otherwise, the digital processing circuit 215 proceeds to step 320.

In step 315, the digital processing circuit 215 causes communication of an emergency event signal/report to an external device, such as the central repository 30 of FIG. 1. Computer equipment and/or technicians may then analyze such an emergency event signals, as well as corresponding emergency event signals from other meters (and/or other seismic sensor arrangements), in order to generate alarms, warning communications, and/or other precautionary command signals as is appropriate. Within the meter 200, after step 315, the digital processing circuit 215 proceeds to step 325 to record an event log for the event, as will be discussed further below in detail.

In step 320, which occurs if no emergency event is indicated, the processing circuit 215 determines whether the seismic signal indicates a recordable non-emergency event. As discussed above, it is advantageous to record events even if the event does not rise to the level of an emergency. To this end, the processing circuit 215 employs another predetermined set of rules that include analysis of the magnitude and/or duration of the non-zero seismic signals. Such a rule, for example, may require an average magnitude of the seismic signal to exceed a predetermined threshold value for a predetermined amount of time.

If the processing circuit 215 determines that the seismic signal does not indicate a recordable event, then the processing circuit 215 has completed the analysis of the current instance of non-zero seismic signals, and proceeds to step 322. If, however, the processing circuit 215 determines that the seismic signal indicates a recordable event, then the processing circuit proceeds to step 325.

In step 322, the processing circuit 215 discards the accumulated stored samples that have been stored since the execution of step 308. The processing circuit 215 then awaits the next non-zero seismic signal.

By contrast, in step 325, the processing circuit 215 generates a record that includes a date and time stamp of the event. The processing circuit 215 also continues to store samples of the seismic signal waveform. In step 330, the processing circuit 215 effectively continues storing the waveform samples until the seismic signal evidences that the event has been completed. For example, the event may be complete when the seismic signal returns to substantially zero for a predetermined amount of time. When the event is determined to be complete, the processing circuit 215 proceeds to step 335.

In step 335, the processing circuit 215 stores the completed record in step 335. The completed record includes the time and date stamp, and can include the accumulated waveform samples. Alternatively, or in addition, the processing circuit 215 can employ the accumulated samples to derive magnitude and duration values that are stored with the data record. In some implementations, a simple time-stamped magnitude and duration value is sufficient. In other implementations, it may be preferable to store the entire waveform.

In either event, the processing circuit 215 thereafter communicates the completed record to an external device (step 340).

Accordingly, the electricity meter 200 equipped with an accelerometer and remote communication ability can be used as an early warning system for utilities, schools and/or other institutions, as well as for improving maintenance on the power grid. With respect to early warning, upon detecting a disturbance, the meter 200 records the event and reports the event to a central data collecting point. Since communications move much faster than seismic waves through the ground, advanced warning can given to institutions in outlying areas.

In a preferred embodiment, the electricity meters 12, 14, 16, 18 and 200 will be installed in a stable environment, always operably connected to communications (wired or wireless) and will always maintain power to report an event even if the grid loses power. To this end, it is preferable to employ battery back-up power to the meter 200 to allow continued operation of the accelerometer circuit 225, processing circuit 215, memory 220 and communication circuit 235 in the event of a power outage.

In addition, advantageous embodiments of such meters are more or less evenly distributed across the landscape and include a stable GPS system time source for time stamping the event.

The above describe embodiments are merely exemplary. Those of ordinary skill in the art may readily devise their own implementations that incorporate the principles of the present invention and fall within the spirit and scope thereof.

I claim:

1. An arrangement for recording seismic events, comprising:
   an electricity meter sensor circuit within an electricity meter housing;
   a digital processing circuit within the electricity meter housing;
   an accelerometer supported by the meter housing and operably connected to the digital processing circuit, the accelerometer configured to provide signals representative of seismic information to the digital processing circuit;
   a memory configured to store data records relating to at least some of the seismic information.

2. The arrangement of claim 1, wherein the electricity meter sensor circuit includes at least one voltage sensor and at least one current sensor operably coupled to the digital processing circuit.

3. The arrangement of claim 1, wherein the digital processing circuit includes an A/D conversion circuit configured to generate digital waveforms, each digital waveform comprising a series of samples of a waveform signal output generated by the accelerometer.

4. The arrangement of claim 3, wherein the memory stores data records including at least one waveform.

5. The arrangement of claim 1, wherein the digital processing circuit is configured to:
   use a predetermined set of rules to determine if a data record is to be stored responsive to the signals representative of seismic information;
   cause the data record to be stored in the memory responsive to the determination.

6. The arrangement of claim 5, wherein the digital processing circuit is further configured to cause communication of a signal indicating an event responsive to the signals representative of seismic information and based on a second predetermined set of rules.

7. The arrangement of claim 1, further comprising a communication circuit configured to communicate with a remote device, and wherein the digital processing circuit is further configured to cause communication of the data record to a remote device.

8. An arrangement for recording seismic events, comprising:
   a meter housing;
   an electricity meter sensor circuit disposed within the meter housing and operably coupled to generate voltage and current measurement signals representative of electrical power delivered to a load;
   a digital processing circuit disposed within the meter housing and operably coupled to receive the voltage and current measurement signals;
   an accelerometer supported by the meter housing, the accelerometer operably connected to the digital processing circuit, the accelerometer configured to provide signals representative of seismic information to the digital processing circuit;

a communication circuit configured to communicate information relating to at least some of the seismic information.

9. The arrangement of claim 8, wherein the electricity meter sensor circuit includes at least one voltage sensor and at least one current sensor.

10. The arrangement of claim 9, wherein the digital processing circuit includes an A/D conversion circuit configured to generate digital waveforms, each digital waveform comprising a series of samples of a waveform signal output generated by the accelerometer.

11. The arrangement of claim 8, further comprising a memory storing data records relating to at least some of the seismic information.

12. The arrangement of claim 11, wherein the digital processing circuit is configured to:
use a predetermined set of rules to determine if a data record is to be stored responsive to the signals representative of seismic information;
cause the data record to be stored in the memory responsive to the determination.

13. The arrangement of claim 12, wherein the digital processing circuit is further configured to cause the communication circuit to communicate a signal indicating an event responsive to the signals representative of seismic information and based on a second predetermined set of rules.

14. The arrangement of claim 13, wherein the communication circuit comprises at least one of the group consisting of a radio circuit, a power line carrier communication circuit, and an optical port.

15. The arrangement of claim 8, wherein the communication circuit comprises a radio device.

16. The arrangement of claim 8, wherein the communication circuit comprises a power line carrier communication circuit.

17. A system, comprising:
a plurality of electricity meters, each electricity meter configured to meter electrical energy provided to a load, each electricity meter including an accelerometer configured to detect seismic events and a communication device configured to transmit information representative of the detected seismic events;
a data collector configured to receive the information representative of detected seismic events from the plurality of electricity meters.

18. The system of claim 17, wherein each electricity meter further comprises a memory storing records of detected seismic events.

19. The system of claim 18, wherein each communication device comprises at least one of the group consisting of a radio circuit and a power line carrier communication circuit.

20. The system of claim 17, wherein each communication device comprises at least one of the group consisting of a radio circuit and a power line carrier communication circuit.

* * * * *